(12) United States Patent
Piazza et al.

(10) Patent No.: US 12,253,155 B2
(45) Date of Patent: Mar. 18, 2025

(54) GEARBOX ASSEMBLY

(71) Applicants: General Electric Company, Schenectady, NY (US); GE Avio S.r.l., Rivalta di Torino (IT)

(72) Inventors: Andrea Piazza, Turin (IT); Ravindra Shankar Ganiger, Bengaluru (IN)

(73) Assignees: GENERAL ELECTRIC COMPANY, Evendale, OH (US); GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 18/661,105

(22) Filed: May 10, 2024

(65) Prior Publication Data

US 2024/0295259 A1 Sep. 5, 2024

Related U.S. Application Data

(63) Continuation of application No. 18/165,590, filed on Feb. 7, 2023, now Pat. No. 12,007,011.

(30) Foreign Application Priority Data

Aug. 12, 2022 (IT) .......................... 102022000017307

(51) Int. Cl.
  *F16H 55/08* (2006.01)
  *F16H 57/02* (2012.01)
(52) U.S. Cl.
  CPC .......... *F16H 55/088* (2013.01); *F16H 57/02* (2013.01); *F16H 55/0886* (2013.01); *F16H 2057/02039* (2013.01)

(58) Field of Classification Search
  CPC ............... F16H 55/088; F16H 55/0886; F05D 2260/40311
  See application file for complete search history.

(56) References Cited

U.S. PATENT DOCUMENTS

| | | |
|---|---|---|
| 4,294,132 A | 10/1981 | Matusz |
| 4,651,588 A | 3/1987 | Rouverol |
| 4,899,609 A | 2/1990 | Nagata |
| 5,083,474 A | 1/1992 | Rouverol |
| 5,485,761 A | 1/1996 | Rouverol |
| 5,802,921 A | 9/1998 | Rouverol |
| 6,230,578 B1 | 5/2001 | Kim et al. |
| 6,682,456 B2 | 1/2004 | Allen et al. |
| 6,918,181 B2 | 7/2005 | Vinayak et al. |
| 9,562,601 B2 | 2/2017 | Beirinckx et al. |

(Continued)

FOREIGN PATENT DOCUMENTS

| | | |
|---|---|---|
| CN | 104214281 A | 12/2014 |
| CN | 106224451 A | 12/2016 |

(Continued)

*Primary Examiner* — Sherry L Estremsky
(74) *Attorney, Agent, or Firm* — Venable LLP; Peter T. Hrubiec; Michele V. Frank

(57) ABSTRACT

A gearbox assembly includes a first gear and a second gear. The first gear includes a plurality of first gear teeth. The second gear includes a plurality of second gear teeth. The plurality of first gear teeth and the plurality of second gear teeth mesh with each other as the first gear and the second gear rotate. A profile shape of at least one first gear tooth of the first gear is characterized by a total profile modification between 66 micrometers and 120 micrometers.

20 Claims, 4 Drawing Sheets

(56) References Cited

U.S. PATENT DOCUMENTS

| | | | |
|---|---|---|---|
| 10,036,464 B2 | 7/2018 | Goto et al. | |
| 10,487,917 B2 | 11/2019 | Chmylkowski | |
| 10,816,076 B2 | 10/2020 | Ohmi | |
| 2021/0374303 A1* | 12/2021 | Nishiura | G06T 7/50 |
| 2022/0154804 A1 | 5/2022 | Klassen et al. | |

FOREIGN PATENT DOCUMENTS

| | | |
|---|---|---|
| DE | 10203979 A1 | 8/2003 |
| DE | 102019106999 A1 | 9/2020 |
| FR | 3077848 A1 | 8/2019 |
| FR | 3127024 A1 | 3/2023 |
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |
| JP | H1089442 A * | 4/1998 |

* cited by examiner

GEARBOX ASSEMBLY

CROSS REFERENCE TO RELATED APPLICATIONS

This application is a continuation of U.S. patent application Ser. No. 18/165,590 filed on Feb. 7, 2023, which claims the benefit of Italian Patent Application No. 102022000017307, filed on Aug. 12, 2022, the contents of both of which are hereby incorporated by reference in their entireties.

TECHNICAL FIELD

The present disclosure relates generally to gearbox assemblies for turbine engines.

BACKGROUND

A turbine engine generally includes a fan and a core section arranged in flow communication with one another. A gearbox assembly is coupled between the fan and the core section.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
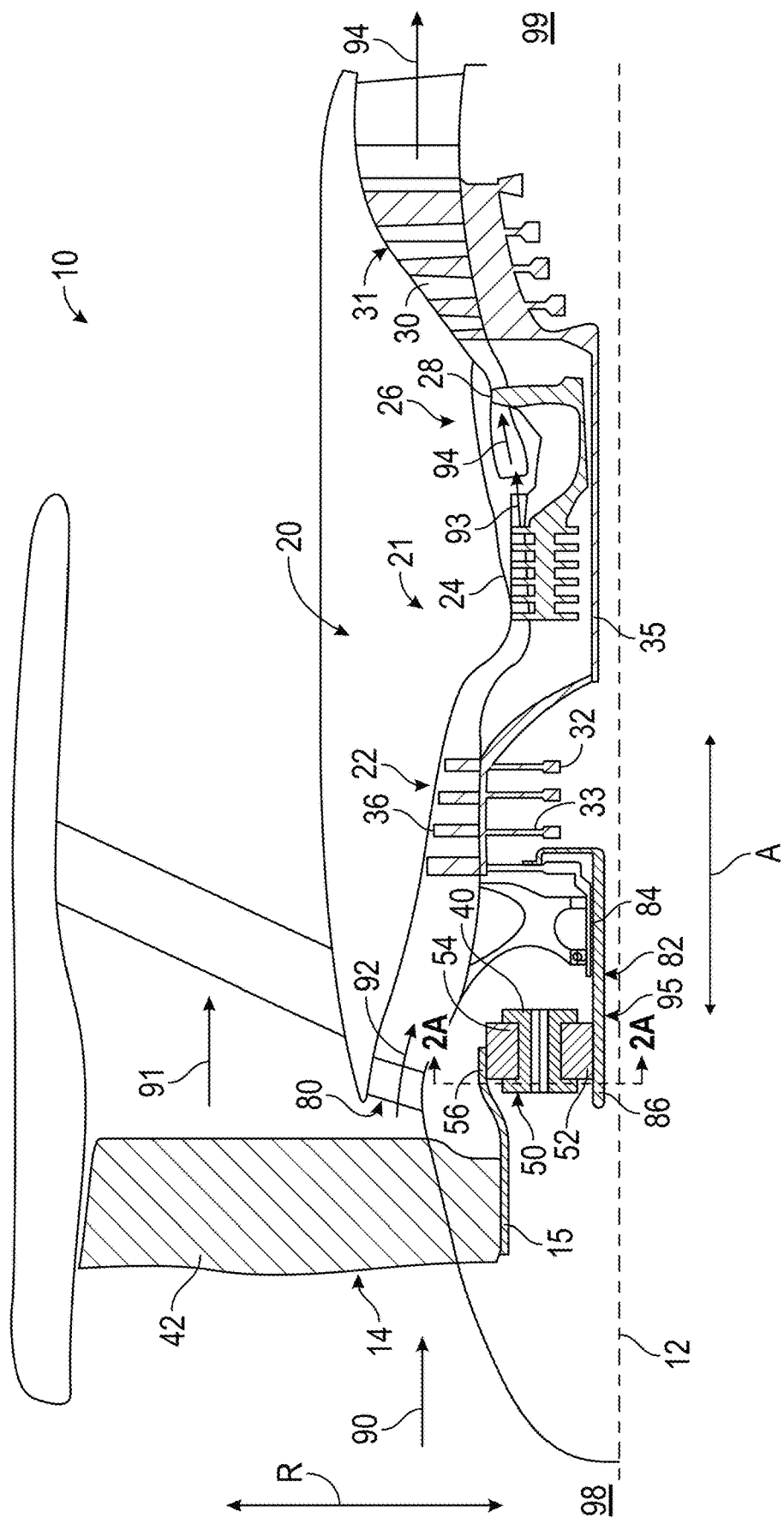
FIG. 1 is a schematic cross-sectional diagram of a turbine engine, taken along a centerline axis of the turbine engine, according to an embodiment of the present disclosure.

Additional features, advantages, and embodiments of the present disclosure are set forth or apparent from a consideration of the following detailed description, drawings, and claims. Moreover, it is to be understood that both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, a "helical gear" is a cylindrical gear with gear teeth that extend at an angle (a helix angle $\Phi$) to an axis of rotation (e.g., in the axial direction) of the gear.

As used herein, a "profile shape" is a shape of a gear tooth of a respective gear.

As used herein, an "involute profile" is a profile shape of a gear tooth that is an involute of a circle. The involute of a circle is a spiraling curve traced by an end of an imaginary taut string unwinding itself from the circle. An example of an involute profile is the profile one sees for the gear face 72 when viewing the gear face 72 along axis A (FIG. 3) before the gear face 72 profile is modified by the tip relief $C_\alpha$ and/or helix relief $C_\beta$.

As used herein, a "helix axis" is an axis along a length of a gear tooth. For example, the helix axis 67 (FIG. 3) is normal to the first end face 72 and the second end face 74. The helix axis 67 of a helical gear is disposed at the helix angle $\Phi$ with respect to the axis 65 (FIG. 3) of the gear.

As used herein, a "profile tip relief," or "$C_\alpha$," is an amount of material relief of a gear tooth manufactured in the radial direction R (FIG. 3), defined in its magnitude from the tip of the gear tooth. The magnitude of the profile tip relief $C_\alpha$ is an amount of material relief between a nominal involute profile of the gear tooth and the actual profile of the gear tooth after the profile tip relief $C_\alpha$.

Figure 3:
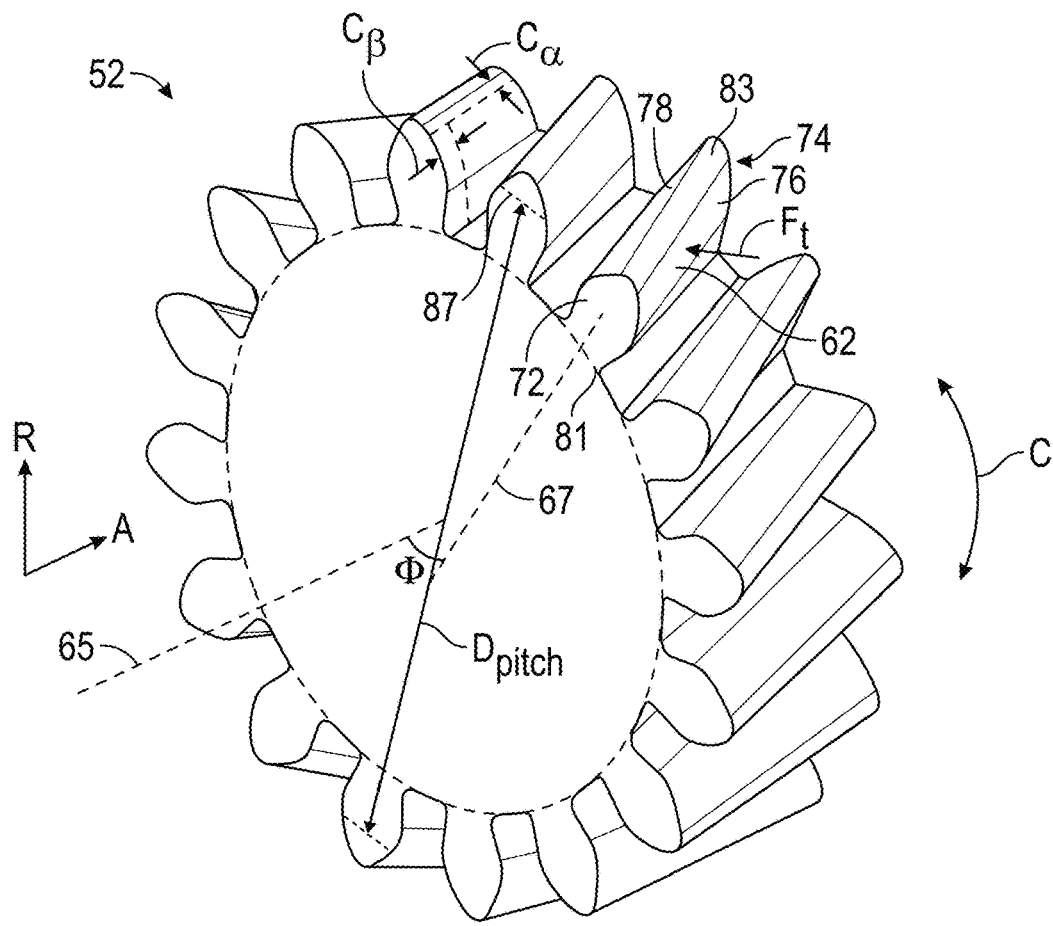
FIG. 3 is a schematic, side view of a portion of the gearbox assembly of FIG. 2, according to an embodiment of the present disclosure.

As used herein, a "helix relief," or "$C_\beta$," also referred to as a crowning, is an amount of material relief of a gear tooth manufactured along the helix axis, defined in its magnitude from the first end face 72 (FIG. 3) and from the second end face 74 (FIG. 3). The magnitude of the helix relief $C_\beta$ is the material relief between the nominal involute profile of the gear tooth and the actual profile of the gear tooth after the helix relief $C_\beta$.

As used herein, a "total profile modification" is a small change in a gear tooth profile from the involute profile, to compensate for manufacturing errors and for changes in the tooth shape under load. A total profile modification M0 can be with respect to the pitch direction or the helix direction (FIG. 3). A total profile modification M0 (FIG. 4) is a change in the involute profile due to both a change in the tip relief $C_\alpha$ and/or the helix relief $C_\beta$. A total profile modification M0 can result when only one of a tip relief $C_\alpha$ and helix relief $C_\beta$ is made, or both are made.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

A turbine engine can be configured as a geared engine. Geared engines include a power gearbox utilized to transfer power from a turbine shaft to a main fan. Such gearboxes may include a sun gear, a plurality of planet gears, and a ring gear. The sun gear meshes with the plurality of planet gears and the plurality of planet gears mesh with the ring gear. In operation, the gearbox transfers the torque transmitted from the turbine shaft operating at a first speed to a fan shaft rotating at a second, lower speed. For a planet configuration of the gearbox, the sun gear may be coupled to the mid-shaft of a lower pressure turbine rotating at the first speed. The plurality of planet gears, intermeshed with the sun gear, then transfer this torque to the fan shaft through a planet carrier. In a star configuration, a ring gear is coupled to the fan shaft. In either configuration, the gear teeth of the respective gears have an involute profile shape.

As the gears rotate and the gear teeth of the respective gears mesh with each other, a tangential force acts upon teeth of the various gears. In a power gearbox, the tangential force is a function of the torque and power transferred through the power gearbox. The tangential force generates a contact pressure on a contacting face of the meshing gear teeth. The contacting face is a face of a respective gear tooth that contacts a corresponding face of a meshing gear tooth. Sliding occurs between respective gear teeth when the contacting pressure acts upon the contacting face at locations that are radially closer to a tip and to a root of the respective gear tooth. The sliding causes wear of the gear teeth of a respective gear. Thus, preferably, the gear teeth of the respective gears of the power gearbox are designed such that the contact pressure acts upon a radial center and an axial center of a contacting face of a respective gear tooth such that the gear teeth roll rather than slide as the gear teeth of respective gears rotate past each other.

One method to generate contact pressure that is focused at the radial center and the axial center of the contacting face and away from the root and the tip is crowning. Crowning is a change of a chordal thickness of a respective gear tooth along its axis. For example, crowning involves relief or removal of material of the respective gear tooth. Excessive crowning, however, leads to an excessive increase of pressure on the contacting face of a respective gear, and an insufficient crowning leads to the contact pressure near the tip or the root. Thus, embodiments of the present disclosure provide for an improved crowning profile for intermeshed gears for power gearboxes subject to high torque requirements in gas turbine engines for aircraft.

As engines increase in power and thrust, the torques described herein become more challenging to accommodate while assuring a sufficient profile design of the gear teeth of a respective gear of the power gearbox. The inventors, seeking to improve upon the existing design of the gears for power gearboxes, designed several different configurations of the gears to arrive at an improved design, better suited to handle the torques (e.g., the tangential forces) on the gears for different architectures, thereby improving efficiency and power output of the power gearbox.

Referring now to the drawings, FIG. 1 illustrates a schematic cross-sectional view of a gas turbine engine, also referred to as engine 10. As shown in FIG. 1, the engine 10 is depicted as a high bypass turbofan engine, incorporating an exemplary embodiment of a shaft assembly 95 according to an aspect of the present disclosure. Although further described below with reference to a turbofan engine, the present disclosure is also applicable to wind turbines and turbomachinery in general, including turbofan, propfan, turbojet, and turboshaft gas turbine engines, including marine and industrial turbine engines and auxiliary power units. As shown in FIG. 1, the engine 10 has an axial centerline axis, also referred to an axis 12, that extends therethrough for reference purposes. The engine 10 defines an axial direction A and a radial direction R. The engine 10 includes a forward end 98 and an aft end 99 along the axial direction A.

In general, the engine 10 includes an engine core 20 and a fan 14. The engine core 20 generally includes, in serial flow arrangement, a compressor section 21, a combustion section 26, and a turbine section 31. The compressor section 21 defines one or more compressors, such as a high-pressure compressor (HPC) 24 and a low-pressure compressor (LPC) 22. The turbine section 31 defines one or more turbines, such as a high-pressure turbine (HPT) 28 and a low-pressure turbine (LPT) 30. In various embodiments, the compressor section 21 may further include an intermediate pressure compressor (IPC). In still other embodiments, the turbine section 31 may further include an intermediate pressure turbine (IPT). In wind turbine applications, the engine core 20 may generally be defined as one or more generators.

The LPC 22, the HPC 24, the HPT 28, and the LPT 30 each includes one or more rotors 32. In one embodiment, the one or more rotors 32 includes one or more shafts 35 of the engine 10 connecting the compressor section 21 to the turbine section 31. In other embodiments, the one or more rotors 32 generally defines a disk 33 extending in the radial direction R, and a plurality of airfoils 36 connected in a circumferentially adjacent arrangement and extending outward in the radial direction R from the disk 33. In various embodiments, one or more compressors of the compressor section 21 are connected and are rotatable with one or more turbines of the turbine section 31 by way of the one or more shafts 35.

The fan 14 generally includes a fan rotor 15. The fan rotor 15 includes a plurality of fan blades 42 that are coupled to and extend outwardly from the fan rotor 15 in the radial direction R. In the embodiments shown in FIG. 1, the fan rotor 15 extends in the axial direction A toward the forward end 98 from a gearbox assembly 40. The gearbox assembly 40 may include a power gearbox. The fan 14 further includes the shaft assembly 95 coupled to the gearbox assembly 40, extended toward the aft end 99 and coupled to the engine core 20.

In one embodiment, the gearbox assembly 40 includes a gear train assembly 50 having any suitable configuration, such as a planetary configuration or a star configuration. For example, as shown in the illustrated embodiment, the gear train assembly 50 includes a sun gear 52 and a plurality of planet gears 54. In some embodiments, the plurality of planet gears 54 are each fixed such that each planet gear 54 rotates on a fixed axis relative to the sun gear 52. A ring gear 56 surrounds the plurality of planet gears 54 and rotates and transfers power and torque from the sun gear 52 through the plurality of planet gears 54. In some embodiments, the ring gear 56 is coupled to the fan rotor 15. In some embodiments, the ring gear 56 is fixed and a planet carrier (not shown in FIG. 1) is coupled to the fan rotor 15 such that the planet carrier rotates and transfers power and torque from the sun gear 52 through the plurality of planet gears 54, as detailed further below. In one embodiment, the sun gear 52 is attached to, or integral with, the shaft assembly 95. In various embodiments, the gearbox assembly 40 may further include additional planet gears disposed radially between the plurality of planet gears 54 and the sun gear 52, or between the plurality of planet gears 54 and the ring gear 56.

The shaft assembly 95 is coupled to the engine core 20 to transmit torque and power through the sun gear 52 to the gearbox assembly 40 to the fan rotor 15 of the fan 14. The fan rotor 15 is coupled to the surrounding ring gear 56 to receive torque from the sun gear 52 and to transfer torque to drive the fan 14. Alternatively, the fan rotor 15 is coupled to the planet gears 54 (e.g., via the planet carrier) to receive torque from the sun gear 52 and to transfer torque to drive the fan 14. As power and torque are transmitted from the engine core 20, the gearbox assembly 40 provides power and torque at an output speed to the fan rotor 15 more suitably adjusted for the fan 14. For example, the gearbox assembly 40 may reduce the speed of the fan rotor 15 relative to the engine core 20 by a factor greater than one.

During operation of the engine 10, as shown in FIG. 1, a volume of air 90 enters the engine 10. As the air passes across the fan blades 42, a portion of the air 91 is directed outside of the engine core 20 to provide propulsion. Additionally, another portion of air 92 is directed through an associated inlet 80 into the compressor section 21. The air 92 is progressively compressed as it flows through the compressor section 21, such as through the LPC 22 and through the HPC 24, toward the combustion section 26.

The now compressed air 93 flows into the combustion section 26 where a fuel is introduced. The fuel is mixed with at least a portion of the compressed air 93, and the fuel-air mixture is ignited to generate combustion gases 94. The combustion gases 94 flow into the turbine section 31, causing rotary members of the turbine section 31 to rotate and to support operation of respectively coupled rotary members in the compressor section 21 and/or to rotate the fan 14. For example, the HPC 24 and the HPT 28 are rotatable to drive the engine 10 and to generate the combustion gases 94 at the combustion section 26 to drive the LPT 30. In some embodiments, the LPT 30 is coupled to the LPC 22. Referring to FIG. 1, a coupling shaft 82 is coupled to the LPC 22 at a first end 84 and to the gearbox assembly 40 at a second end 86. In other embodiments, the coupling shaft 82 is coupled to the HPC 24 at the first end 84. In other embodiments, the coupling shaft 82 is coupled to the turbine section 31 at the first end 84 and to the gearbox assembly 40 at the second end 86. In other embodiments, the coupling shaft 82 is coupled to the HPT 28 at the first end 84. The gearbox assembly 40 may reduce the rotational speed from the engine core 20 (e.g., the compressor section 21 or the turbine section 31) and provide a desired amount of torque and a desired amount of rotational speed to the fan 14.

Figure 2A:
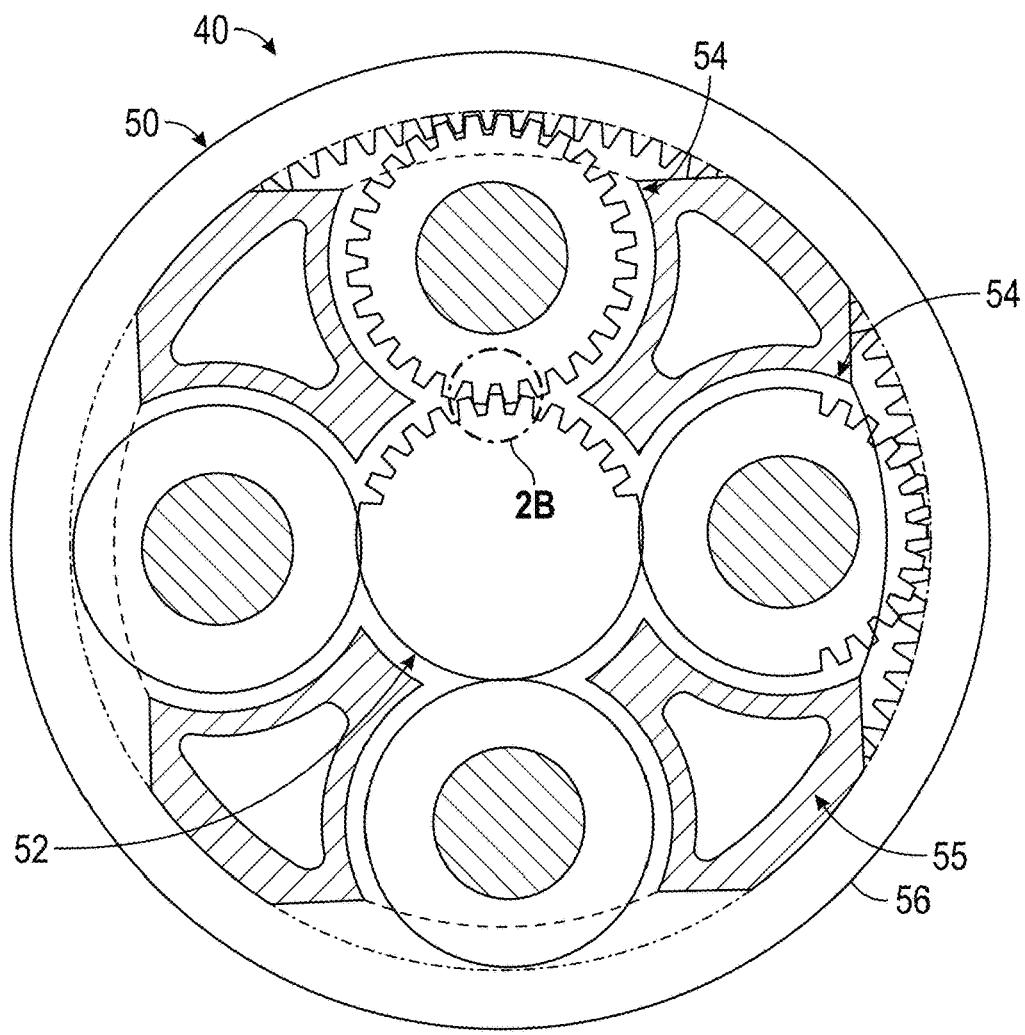
FIG. 2A is a schematic, cross-sectional end view, taken along line 2A-2A in FIG. 1, of a gear train assembly of a gearbox assembly for a gas turbine engine, according to an embodiment of the present disclosure.

FIG. 2A shows a schematic axial end cross-sectional view of gear train assembly 50 of the gearbox assembly 40. The gear train assembly 50 includes a sun gear 52, a plurality of planet gears 54, and a ring gear 56. The engine core 20 (FIG. 1) drives the shaft assembly 95 (FIG. 1), which is coupled to the sun gear 52 of the gear train assembly 50, as detailed above. Radially outwardly of the sun gear 52, and intermeshing therewith, is the plurality of planet gears 54 that are coupled together by a planet carrier 55. The planet carrier 55 constrains the plurality of planet gears 54 to rotate around the sun gear 52 in synchronicity while enabling each planet gear of the plurality of planet gears 54 to rotate about its own axis. Radially outwardly of the plurality of planet gears 54, and intermeshing therewith, is the ring gear 56, which is an annular ring gear 56.

Although shown only partially in FIG. 2A for clarity, each of the sun gear 52, the plurality of planet gears 54, and the ring gear 56 comprises teeth about their periphery to intermesh with the other gears. The gearbox assembly 40 of FIG. 2A is illustrated as a star type gearbox assembly, in that the planet carrier 55 is held fixed, with the ring gear 56 allowed to rotate. In such an arrangement, the fan 14 is driven by the ring gear 56. However, other suitable types of the gearbox assembly 40 may be employed. In one non-limiting example, the gearbox assembly 40 is a planetary type gearbox assembly, in that the planet carrier 55 is coupled to an output shaft and allowed to rotate, with the ring gear 56 being fixed, such that the fan 14 is driven by the planet carrier 55. In another non-limiting embodiment, the gearbox assembly 40 may be a differential gearbox in which the ring gear 56 and the planet carrier 55 are both allowed to rotate.

Figure 2B:
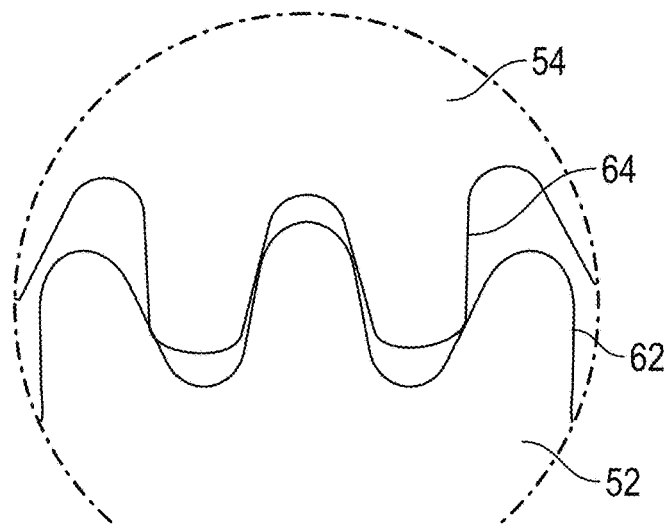
FIG. 2B is a front view of a gear mesh, taken at detail 2B in FIG. 2A, of the gearbox assembly, according to an embodiment of the present disclosure.

FIG. 2B is a schematic front view, taken at detail 2B in FIG. 2A, of a meshing between the sun gear 52 and a planet gear 54. While the exemplary embodiment references a meshing between the sun gear 52 and the planet gear 54, the embodiments described herein may be used in any of the gears of the gearbox assembly 40. For example, the meshing may be a meshing between the planet gear 54 and the ring gear 56. The sun gear 52 includes sun gear teeth 62 and the planet gear 54 includes planet gear teeth 64. The sun gear teeth 62 mesh with the planet gear teeth 64. The sun gear teeth 62 contact the planet gear teeth 64 and define a mesh contact ratio $\varepsilon\gamma$. The mesh contact ratio $\varepsilon\gamma$ is an average number of pairs of teeth (e.g., the sun gear teeth 62 and the planet gear teeth 64) in contact at the same time between the meshing gears (e.g., the sun gear 52 and the planet gear 54) as the gears rotate. The mesh contact ratio accounts for the teeth that are sliding into the mesh as the gears rotate, the teeth that are sliding out of the mesh as the gears rotate, and the teeth that are in full contact as the gears rotate. As the gears rotate, the number of pairs of teeth that are in contact fluctuates as a first pair of mating teeth come into contact before a second pair of mating teeth is out of contact. For example, the mesh contact ratio $\varepsilon\gamma$ of the sun gear 52 and the planet gear 54 illustrated in FIGS. 2A and 2B is three point four (3.4). A mesh contact ratio between three (3) and four (4) means that the number of pairs of mating teeth fluctuates between three (3) and four (4) as the gears rotate. The mesh between the sun gear teeth 62 and the planet gear teeth 64 defines a contact pressure profile along an axial face of each tooth, as detailed further below.

FIG. 3 is a schematic isometric front view of the sun gear 52 isolated from the gearbox assembly 40, according to an aspect of the present disclosure. FIG. 3 shows the sun gear 52 including a helical gear. In this way, the sun gear 52 is a cylindrical gear with the sun gear teeth 62 (only one of which is labeled in FIG. 3 for clarity) extending at an angle to an axis 65 of rotation of the sun gear 52. Helical gears include a larger mesh contact ratio than spur gears in which the teeth do not extend at an angle with respect to an axis of rotation (e.g., the teeth of a spur gear are straight). Thus, helical gears reduce vibration and reduce noise as compared to spur gears.

Each sun gear tooth 62 includes a first end face 72 and a second end face 74 opposite the first end face 72. Each sun gear tooth 62 also includes a first axial face 76 and a second axial face 78 opposite the first axial face 76 that extend from the first end face 72 to the second end face 74. Each sun gear tooth 62 defines a helix axis 67 along a length of the sun gear tooth 62. The helix axis 67 is normal to the first end face 72 and the second end face 74. The helix axis 67 is disposed at a helix angle Φ with respect to the axis 65 (e.g., with respect to the axial direction A). The first axial face 76 and the second axial face 78 extend in an axial direction at the helix angle Φ from the first end face 72 to the second end face 74. The first axial face 76 is a contacting face, as detailed further below. For example, the first axial face 76 contacts a corresponding first axial face of a gear tooth (e.g., the planet gear teeth 64 of FIG. 2A) of the meshing gear (e.g., the planet gear 54 of FIG. 2A) as the gears rotate. In some embodiments, the second axial face 78 may be a contacting face. Each sun gear tooth 62 extends in a radial direction from a root 81 to a tip 83. Each sun gear tooth 62 includes an involute profile defined by the first end face 72 and by the second end face 74.

When the sun gear 52 rotates and the sun gear teeth 62 mesh with the planet gear teeth 64, a force between the meshing teeth develops normal to the contacting surfaces of the meshing teeth. For example, a tangential force $F_t$ acts upon the first axial face 76 or the second axial face 78 from the planet gear teeth 64. The tangential force $F_t$ is a force normal to the first axial face 76 or the second axial face 78 of the sun gear tooth 62. The tangential force $F_t$ generates the contact pressure on the first axial face 76 or the second axial face 78. If the contact pressure is radially closer to the root 81 or to the tip 83, sliding occurs and the sun gear teeth 62 will wear at the first axial face 76 or the second axial face 78 in an area about the root 81 or the tip 83. Likewise, if the contact pressure is axially closer to the first end face 72 or the second end face 74, sliding occurs and the sun gear teeth 62 will wear at the first axial face 76 or the second axial face 78 in an area about the first end face 72 or the second end face 74. For example, contact on the sun gear teeth 62 starts at the tip 83, rolls down the tooth (e.g., the first end face 72), and ends near the root 81 as the sun gear 52 rotates and the sun gear teeth 62 mesh with the planet gear teeth 64. Thus, preferably, the sun gear teeth 62 are designed such that the contact pressure is concentrated on the first axial face 76 or the second axial face 78 at a radial center and an axial center of the first axial face 76 or the second axial face 78. Therefore, embodiments of the present disclosure provide for a total profile modification M0 of the sun gear teeth 62.

As shown in FIG. 3, the total profile modification M0 includes a profile tip relief $C_\alpha$ and a helix relief $C_\beta$. The profile tip relief $C_\alpha$ is an amount of material relief of the sun gear teeth 62 manufactured in the radial direction R, defined in its magnitude from the tip 83. The magnitude of the profile tip relief $C_\alpha$ is an amount of material relief between a nominal involute profile of the sun gear teeth 62 and the actual profile of the sun gear teeth 62 after the profile tip relief $C_\alpha$. The helix relief $C_\beta$, also referred to as a crowning, is an amount of material relief of the sun gear teeth 62 manufactured along the helix axis 67, defined in its magnitude from the first end face 72 and from the second end face 74. The magnitude of the helix relief $C_\beta$ is the material relief between the nominal involute profile of the sun gear teeth 62 and the actual profile of the sun gear teeth 62 after the helix relief $C_\beta$. As used herein, the total profile modification includes small changes in a gear tooth profile from the involute profile, to compensate for manufacturing errors and for changes in the tooth shape under load. For example, the total profile modification includes removing material from the gear tooth to generate a modification to the involute profile of the gear tooth. The total profile modification M0 is defined as the sum of $C_\alpha$ and $C_\beta$.

When developing a gas turbine engine, the interplay among components can make it particularly difficult to select or to develop one component during engine design and prototype testing, especially, when some components are at different stages of completion and power and torque requirements become more demanding as compared to prior gearbox designs. The anticipated loading environment on the gearbox, in particular, eccentric loading on gear tooth during high power states, or external forces that cause slight misalignment, twisting etc. may result in significant wearing patterns on gear teeth not previously of significance in prior designs. The prevalence of eccentric loading can result in lost efficiency (torque-input/torque-output) due to surface wear. Thus, the embodiments herein provide for a gear tooth profile suited for the specific loading environment of the power gearbox supporting engine mission requirements, not an overdesign that unnecessarily increases overall weight or size, nor under-design resulting in lost efficiency due to wear, or reduced cycles before repair or maintenance is needed.

Additionally, the inventors recognize the uncertainty on what design is needed to operate at high power requirements and this uncertainty can result in costly re-design. For example, one or more components may be nearly complete, yet one or more other components may be in an initial or a preliminary phase such that only one (or a few) design parameters are known. The inventors desire to arrive at design possibilities at an early stage of design, so that the downstream selection of candidate optimal designs, given the tradeoffs, become more predictable. Heretofore, the process has sometimes been more ad hoc, selecting one design or another without knowing the impact when a concept is first taken into consideration. For example, and referring to FIG. 1, various aspects of the fan 14 design, the combustion section 26 design, the compressor section 21 design, the turbine section 31 design, etc., may not be known, but such components impact a tangential force on the sun gear teeth 62 (FIG. 3) of the sun gear 52 (FIG. 3) of the gearbox assembly 40 (FIG. 1) and, thus, may influence the design of the components of the gearbox assembly 40.

The design of the gearbox assembly 40 includes a design of the sun gear teeth 62 of the sun gear 52 (or the gear teeth of any of the planet gears 54 or the ring gear 56), for example, a design of the profile shape of the sun gear teeth 62. The profile shape of the sun gear teeth 62 includes a total profile modification in which material is removed from the sun gear teeth 62 to define the total profile modification as compared to the involute profile of the sun gear teeth 62.

The inventors desire to improve upon gearbox efficiency, and narrow the range of configurations or combination of features that can yield favorable results given the constraints of the design, feasibility, manufacturing, certification requirements, etc., and moreover arrive at a more favorable design better suited to handle the torques and the forces on the gears for unique to certain architectures, thereby improving efficiency in the conversion of kinetic energy in the fluid stream to mechanical energy in the turbine shaft. The inventors also desire to make selections earlier in the design selection process to avoid wasted time and effort. During the course of the evaluation of different embodiments as set forth herein, the inventors, discovered, unexpectedly, that improved efficiency resulted when modifications to the relief in pitch and helix were made according to only a relatively few engine parameters. This development is based on, among other things, the recognition that the total profile modification of the sun gear teeth 62 (or any teeth of any of the gears of the gearbox assembly 40) is related to the size and, therefore, the efficiency of a gearbox assembly. From this initial recognition and other developments that were the by-product of studying several different engine configurations that included a gearbox assembly (including the configurations disclosed herein), the inventors, ultimately discovered that there exists a relationship among the tangential force at each mesh, the material properties of the gear, the mesh contact ratio, and the unit length of contact at the mesh, which uniquely identifies a finite and readily ascertainable (in view of this disclosure) number of embodiments suitable for a particular architecture that addresses the total profile modification required to prevent sliding, and, therefore, reduce wear, on the sun gear teeth 62 as the sun gear teeth 62 contact the planet gear teeth 64. This relationship is referred to by the inventors as the total profile modification, and is defined according to the following relationship (1):

$$\text{Total Profile Modification } (M0) \geq \frac{F_t}{(3.2\ K_{max}\ \varepsilon\gamma\ X_0)} \quad (1)$$

$F_t$ is the tangential force acting on the first axial face 76 as the first axial face 76 contacts a corresponding planet gear tooth 64, as detailed above. $K_{max}$ is a stiffness per unit length of each sun gear tooth 62. $K_{max}$ is the ratio of the force applied to a beam versus the deflection in the direction of the force, per unit width of the beam. $K_{max}$ is based on a material of the sun gear 52 and dimensions of the sun gear teeth 62. In some embodiments, the sun gear 52 is made of steel, and $K_{max}$ is about sixteen Newtons per millimeter micrometer (16 N/mm*μm). $K_{max}$ is the maximum stiffness of the sun gear teeth 62 in a direction of the tangential force Ft (e.g., in a direction normal to the gear tooth surface along the axial faces of the gear tooth). The maximum stiffness is at a radially middle portion of a respective tooth (e.g., at a maximum thickness of the tooth), and the stiffness decreases towards the root 81 and the tip 83 (e.g., at a minimum thickness of the tooth). The mesh contact ratio $\varepsilon\gamma$ is the average pair of sun gear teeth 62 in contact with the planet gear teeth 64 at the same time during rotation of the sun gear 52, as detailed above. $X_0$ is the unit length of contact on the first axial face 76 between the sun gear teeth 62 and the planet gear teeth 64. The unit length of contact is measured in the radial direction R.

The inventors further discovered that the tangential force $F_t$ in turbine engine 10 can be determined from the torque of the fan 14, the gear ratio of the gearbox assembly 40, the pitch diameter of the sun gear 52, and the number of meshes between the sun gear 52 and the planet gear 54, as follows:

$$\text{Tangential Force } (F_t) = \frac{\left(\frac{T_{fan}}{\text{Gear ratio}}\right)}{\frac{\text{Pitch Diameter}}{\text{Number of Meshes}}} \quad (2)$$

$T_{fan}$ is the torque of the fan 14. The torque of the fan 14 is a function of the power of the fan 14 and the speed of the fan 14. For example, the torque of the fan 14 is the power of the fan 14 over the speed of the fan 14. The power of the fan 14 and the speed of the fan 14 are determined at a maximum power and at a maximum speed (e.g., at takeoff conditions of the turbine engine 10). At such conditions, the torque of the fan 14 is a maximum, and thus the tangential force $F_t$ is a maximum. The gear ratio is a ratio of the speed of the input gear (e.g., the sun gear 52) to the speed of the output (e.g., the ring gear 56) through the gearbox assembly 40. In the planet configuration, the output is the planet carrier 55. The pitch diameter $D_{pitch}$ is the diameter of a pitch circle 87. The pitch circle 87 is an imaginary circle that corresponds to a point at which each tooth of the gear contacts a corresponding point of the mating gear. A portion of the pitch circle 87 is shown in FIG. 3 at the pitch diameter measurement for clarity. The number of meshes is the number of meshes between the sun gear 52 and the other gears. In the exemplary embodiments, there are four meshes as the sun gear 52 meshes with four planet gears 54 (FIG. 2A).

Therefore, the inventors, found that a desired total profile modification M0 can be determined from a known fan 14 power condition at take-off conditions (e.g., the power and the speed of the fan 14), material properties of the sun gear 52 (e.g., $K_{max}$), and the dimensions of the sun gear 52 and planet gear 54 (e.g., the mesh contact ratio and the unit length of contact), as follows:

$$\text{Total Pofile Modification } (M0) \geq \frac{\left(\frac{\left(\frac{T_{fan}}{\text{Gear ratio}}\right)}{\frac{\text{Pitch Diameter}}{\text{Number of Meshes}}}\right)}{(3.2\ K_{max}\ \varepsilon\gamma\ X_0)} \quad (3)$$

In particular, the inventors were able to identify a certain range of total profile modification M0 for a sun gear 52 (and/or other gears of the gearbox assembly 40) to achieve the foregoing objectives mentioned earlier (less loss in efficiency, reduced wear, etc.). Using this unique relationship, a suitable gearbox assembly 40 design can be identified relatively early in a design process, and provides for a more compact gearbox assembly 40 that reduces engine weight and increases efficiency.

Figure 4:
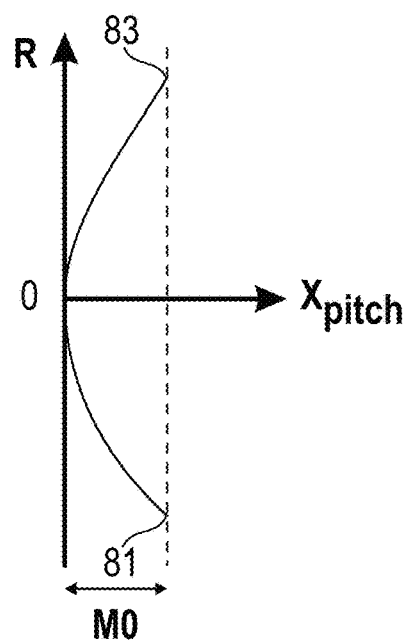
FIG. 4 is a graph illustrating a total profile modification along the radial direction of a sun gear tooth, according to an embodiment of the present disclosure.

FIG. 4 is a graph depicting the total profile modification M0 along the radial direction R (FIG. 3) of a sun gear tooth 62 (FIG. 3), wherein $X_{pitch}$ is a distance of the sun gear tooth 62 in a circumferential direction C (FIG. 3) along the helix axis 67 (FIG. 3). The zero (0) value of the graph is at a radial center of the first axial face 72 (FIG. 3) and at a maximum circumferential location of the first axial face 72 (e.g., at a circumferential location at which the first axial face 72 is thickest). FIG. 4 depicts a total profile modification M0 with respect to the involute profile of a sun gear tooth 62. In this way, FIG. 4 shows the amount of material removed as a function of the radial direction R and the $X_{pitch}$ of a respective sun gear tooth 62 when viewed along the helix axis 67 (FIG. 3). As detailed above, the total profile modification M0 is the sum of the profile tip relief $C_\alpha$ and the helix relief $C_\beta$. As shown in FIG. 4, the total profile modification M0 is zero at a radially center of the first axial face 76 (FIG. 3) and increases along the radial direction R towards the root 81 and towards the tip 83. That is, no material is removed at the radial center and the helix axial center (e.g., an axial center along the helix axis 67) along the first axial face 76 of the sun gear tooth 62. More material is removed towards the root 81 and towards the tip 83 and towards the first end face 72 (FIG. 3) and the second end face 74 (FIG. 3). For example, $C_\alpha$ increases towards the root 81 and the tip 83 and decreases toward the radial center of the first axial face 76. $C_\beta$ increases toward the first end face 72 (FIG. 3) and the second end face 74 (FIG. 3) and decreases toward the helix axial center of the first axial face 76. Thus, the total profile modification M0 ($C_\alpha+C_\beta$) is a maximum at the root 81 and the tip 83 and at the first end face 72 and the second end face 74 of the sun gear tooth 62. The profile modification M0 is a minimum (or is zero) at the radial center and the helix axial center of the first axial face 76 of the sun gear tooth 62.

Table 1 describes exemplary embodiments 1 to 11 identifying the total profile modification M0 of a gear of a gearbox assembly 40 for various turbine engines. Embodiments 1 to 11 may represent the turbine engine 10 described with respect to FIG. 1 and can be applied to the gearbox assembly 40 described in FIGS. 1, 2A, and 2B. In Table 1, the total profile modification M0 ($C_\alpha+C_\beta$) is determined based on the relationship (1) described above. The tangential force $F_t$ is determined based on the relationship (2) described above. In embodiments 1 to 11, the stiffness per unit length $K_{max}$ is between thirteen Newtons per millimeter micrometers (13 N/(mm*μm)) and nineteen Newtons per millimeter micrometers (19 N/(mm*μm)). Values of $K_{max}$ that are closer to thirteen Newtons per millimeter micrometers (13 N/(mm*μm)) provide for a more flexible gear tooth as compared to higher values of $K_{max}$. Values of $K_{max}$ that are below thirteen Newtons per millimeter micrometers (13 N/(mm*μm)) may provide an undesired gear tooth deflection that causes vibrations in the gear. Values of $K_{max}$ that are closer to nineteen Newtons per millimeter micrometers (19 N/(mm*μm)) provide for a stiffer gear tooth as compared to lower values of $K_{max}$. Values of $K_{max}$ that are above nineteen Newtons per millimeter micrometers (19 N/(mm*μm)) may be stiffer than desired and cause undesired load concentration on the gear tooth. In some embodiments, the stiffness per unit length $K_{max}$ is between fifteen Newtons per millimeter micrometers (15 N/(mm*μm)) and seventeen Newtons per millimeter micrometers (17 N/(mm*μm)). Preferably, the stiffness per unit length $K_{max}$ is sixteen Newtons per millimeter micrometers (16 N/(mm*μm)). Thus, $K_{max}$ is selected based on a balance of controlling the load concentration on the gear tooth while avoiding undesired vibrations on the gear tooth.

In embodiments 1 to 11, the mesh contact ratio εγ is between two point three (2.3) and five (5). Values of εγ that are below two point three (2.3) provide for a face width of the gear teeth that is excessively reduced such that the greater contact area provided by helical gear teeth as compared to spur gear teeth or to other types of gear teeth is diminished. Accordingly, the strength advantage and higher load capacity provided by helical gear teeth as compared to spur gear teeth or to other types of gear teeth is reduced. Values of εγ that are above five (5) provide for a larger face width of the gear teeth as compared to lesser values of εγ and may result in undesired and excessive twisting due to torsional windup provided by the larger face width of the gear teeth. In some embodiments, the mesh contact ratio εγ is between two point six (2.6) and four point two (4.2). Thus, the range of εγ is selected to provide for a balance between avoiding excessive twisting of the gear teeth while providing for increased strength and load capacity as compared to spur gear teeth or other types of gear teeth.

In embodiments 1 to 11, the unit length of contact $X_0$ is between two point five millimeters (2.5 mm) and five point five millimeters (5.5 mm). Values of $X_0$ that are below two point five millimeters (2.5 mm) provide for a tooth height of the gear teeth that is too small such that it may be difficult to apply a heat treatment (e.g., to increase the hardness of the gear teeth in the heated area). Values of $X_0$ that are above five point five millimeters (5.5 mm) provide for undesired and excessive sliding between the gear teeth. In some embodiments, the unit length of contact $X_0$ is between three point two millimeters (3.2 mm and four point eight millimeters (4.8 mm). Thus, $X_0$ is selected based on a balance of providing a tooth height of the gear teeth for applying a heat treatment to the gear teeth while avoiding undesired and excessive sliding of the gear teeth.

TABLE 1

| Emb. | Total Profile Modification (μm) | Tangential Force (N) | $K_{max}$ (N/mm*μm) | Mesh Contact Ratio | Unit Length of Contact (mm) |
|---|---|---|---|---|---|
| 1 | 120 | 42,000 | 13 | 2.3 | 3.66 |
| 2 | 66 | 70,000 | 19 | 5 | 3.49 |
| 3 | 90 | 47,000 | 15 | 2.6 | 4.2 |
| 4 | 68 | 51,000 | 17 | 4.2 | 3.28 |
| 5 | 104 | 42,000 | 13 | 3.9 | 2.5 |
| 6 | 68 | 70,000 | 19 | 3.1 | 5.5 |
| 7 | 71 | 47,000 | 15 | 4.3 | 3.2 |
| 8 | 67 | 51,000 | 17 | 2.9 | 4.8 |
| 9 | 120 | 70,000 | 19 | 3 | 3.2 |
| 10 | 99 | 60,000 | 19 | 3.1 | 3.2 |
| 11 | 66 | 42,000 | 19 | 3.27 | 3.2 |

Figure 5:
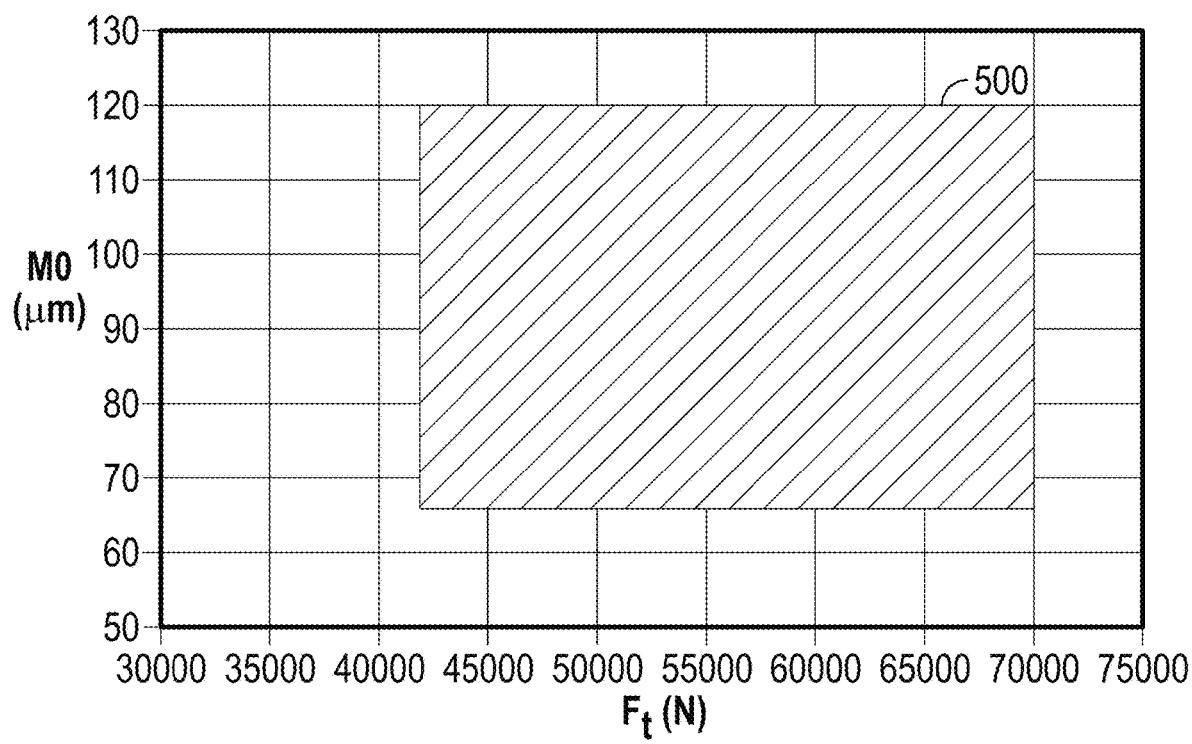
FIG. 5 is a graph illustrating a total profile modification as a function of tangential force of a sun gear tooth, according to embodiments of the present disclosure.

FIG. 5 represents, in graph form, the total profile modification M0 as a function of the tangential force $F_t$. Table 1 and FIG. 5 show that the total profile modification M0 may be changed based on the tangential force $F_t$. An area 500 may present the boundaries of the total profile modification M0 as a function of the tangential force $F_t$ in which a particular gearbox assembly is designed, according to one embodiment. As shown in FIG. 5, the total profile modification M0 is a function of the tangential force $F_t$ on a given tooth of a corresponding gear. The total profile modification M0 is between sixty-six micrometers (60 μm) and one hundred twenty micrometers (120 μm) at a tangential force $F_t$ between forty-two thousand Newtons (42,000 N) and seventy thousand Newtons (70,000 N). Values of the tangential force $F_t$ are dependent on the engine parameters and the gearbox size, as detailed above. Values of the total profile modification M0 above one hundred twenty micrometers (120 μm) provide for smaller gear teeth compared to gear teeth with a profile modification less than one hundred twenty micrometers (120 μm), and thus, provide an inadequate (e.g., too small) case carburizing (e.g., heat treatment for hardening the gear tooth material) depth that is unequal over the surface of the gear tooth. Values of the total profile modification M0 below sixty-six micrometers (66 μm) provide for an inadequate amount of material removal such that the contact pressure is not concentrated at a radial center and an axial center along the helix axis 67 (FIG. 3) of the first axial face 76 of the gear teeth and excessive slippage (e.g., sliding) occurs between the gear teeth. The range of the total profile modification M0 provides for ensuring that the contact pressure is concentrated at a radial center and an axial center along the helix axis 67 of the first axial face 76 for a particular engine or for a particular gearbox assembly.

In general, as the tangential force $F_t$ increases, the total profile modification M0 increases. For example, as the torque of the fan 14 increases (e.g., turbine engines that have fans with greater powers and higher speed), the total profile modification M0 increases to account for the increased tangential force $F_t$ that acts upon the gear teeth such that the contact pressure is concentrated at a radial center and an axial center along the helix axis 67 of the first axial face 76. In this way, the total profile modification M0 reduces gear teeth slippage or prevents the gear teeth from excessive slippage and, thus, reduces wear of the gear teeth as compared to gears without the benefit of the present disclosure.

In some instances, the total profile modification M0 is reduced as the tangential force $F_t$ increases, for example, if the maximum stiffness $K_{max}$, the mesh contact ratio $\epsilon\gamma$, or the unit length of contact $X_0$ increases for a particular gear. Thus, the total profile modification M0 will be reduced for a particular tangential force $F_t$ on the gear for gears where the maximum stiffness $K_{max}$ of the gear is greater, if the mesh contact ratio $\epsilon\gamma$ is greater, or if the unit length of contact $X_0$ is greater.

Figure 6:
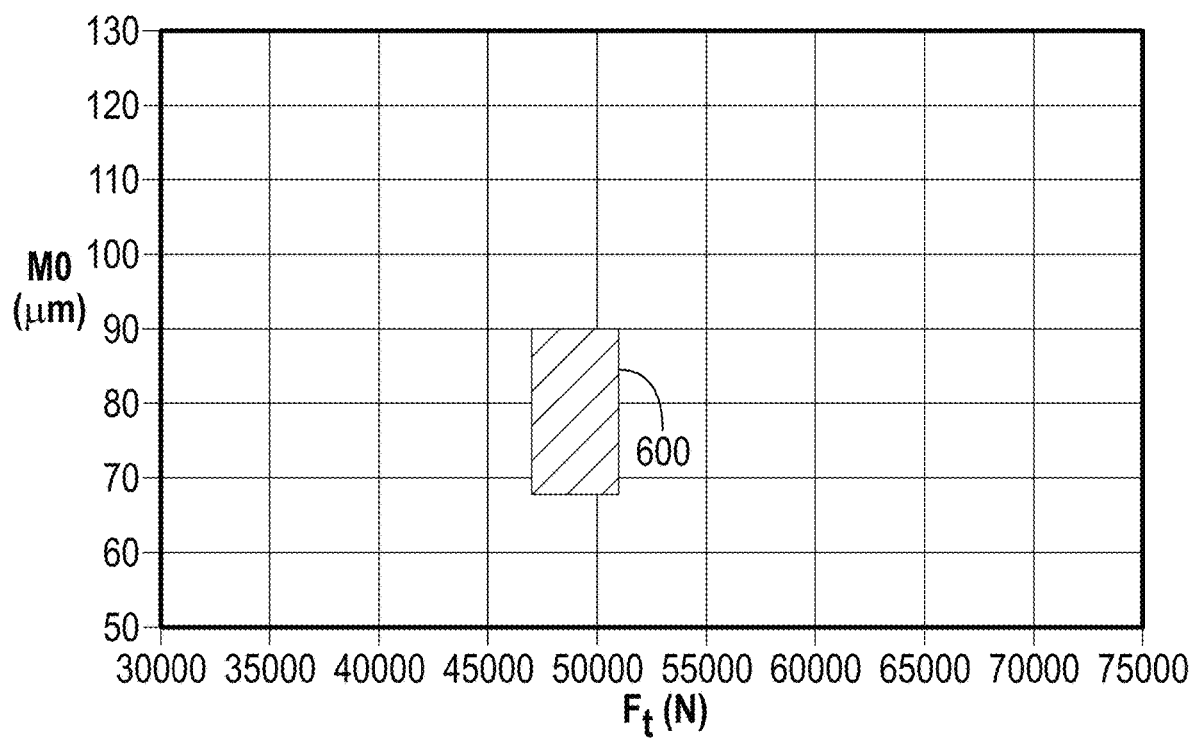
FIG. 6 is a graph illustrating a total profile modification as a function of tangential force of a sun gear tooth, according to another embodiment of the present disclosure.

FIG. 6 represents, in graph form, the total profile modification M0 as a function of the tangential force $F_t$, according to another embodiment. An area 600 may present the boundaries of the total profile modification M0 as a function of the tangential force $F_t$ in which a particular gearbox assembly is designed, according to another embodiment. As shown in FIG. 6, the total profile modification M0 is a function of the tangential force $F_t$ on a given tooth of a corresponding gear. The total profile modification M0 is between sixty-eight micrometers (68 µm) and ninety micrometers (90 µm) at a tangential force $F_t$ between forty-seven thousand Newtons (47,000 N) and fifty-one thousand Newtons (51,000 N). The range of the total profile modification M0 provides for ensuring that the contact pressure is concentrated at a radial center and an axial center along the helix axis 67 (FIG. 3) of the first axial face 76 (FIG. 3) for a particular engine or for a particular gearbox assembly, as detailed above.

As detailed above, the embodiments of the present disclosure provide for a relationship of a total profile modification for a gear of a power gearbox as a function of turbine engine parameters (e.g., a torque of the fan), and parameters of the power gearbox of the turbine engine (e.g., gear ratio, pitch diameter of the gear, number of meshes of the gear). The inventors discovered a unique relationship of the total profile modification based on the engine parameters and the parameters of the power gearbox such that the total profile modification can be more readily determined without the need to perform in-depth numerical analysis for a particular power gearbox. Thus, the relationship of the total profile modification disclosed herein provides for an improved profile shape of a gear that provides for a more compact power gearbox assembly, and thus greater efficiency and greater reliability of the power gearbox as compared to power gearboxes without the benefit of the present disclosure. Therefore, the relationship of the total profile modification of the present disclosure enables gear designs better suited to handle the torques (e.g., the tangential forces) on the gears for different turbine engine architectures, thereby improving efficiency and power output of the power gearbox.

Further aspects of the present disclosure are provided by the subject matter of the following clauses.

A gearbox assembly includes a first gear and a second gear. The first gear includes a plurality of first gear teeth. The second gear includes a plurality of second gear teeth. The plurality of first gear teeth and the plurality of second gear teeth mesh with each other as the first gear and the second gear rotate. A profile shape of at least one first gear tooth of the first gear is characterized by a total profile modification between sixty-six (66) micrometers and one hundred twenty (120) micrometers.

The gearbox assembly of the preceding clause, the first gear being a sun gear and the second gear being a plurality of planet gears.

The gearbox assembly of any preceding clause, the total profile modification being between sixty-eight (68) micrometers and ninety (90) micrometers.

The gearbox assembly of any preceding clause, the total profile modification being a function of a tangential force on the at least one first gear tooth, a stiffness per unit length of the at least one first gear tooth, a mesh contact ratio of the first gear and the second gear, and a unit length of contact between the at least one first gear tooth and a respective second gear tooth.

The gearbox assembly of any preceding clause, the total profile modification being greater than or equal to $$\frac{F_t}{(3.2 \ K_{max} \ \epsilon\gamma \ X_0)}$$

$F_t$ being the tangential force in Newtons, $K_{max}$ being the stiffness per unit length in Newtons per millimeters micrometers, $\epsilon\gamma$ being the mesh contact ratio, and $X_0$ being the unit length of contact in millimeters.

The gearbox assembly of any preceding clause, $F_t$ being between forty-two thousand (42,000) Newtons and seventy thousand (70,000) Newtons.

The gearbox assembly of any preceding clause, $F_t$ being between forty-seven thousand (47,000) Newtons and fifty-one thousand (51,000) Newtons.

The gearbox assembly of any preceding clause, $K_{max}$ being between thirteen (13) Newtons per millimeter micrometer and nineteen (19) Newtons per millimeter micrometer.

The gearbox assembly of any preceding clause, $K_{max}$ being between fifteen (15) Newtons per millimeter micrometer and seventeen (17) Newtons per millimeter micrometer.

The gearbox assembly of any preceding clause, $\epsilon\gamma$ being between two point three (2.3) and five (5).

The gearbox assembly of any preceding clause, $\epsilon\gamma$ being between two point six (2.6) and four point two (4.2).

The gearbox assembly of any preceding clause, $X_0$ being between two point five (2.5) millimeters and five point five (5.5) millimeters.

The gearbox assembly of any preceding clause, $X_0$ being between three point two (3.2) millimeters and four point eight (4.8) millimeters.

The gearbox assembly of any preceding clause, the gearbox assembly being coupled to a fan of a turbine engine, and $F_t$ being a function of a torque of the fan, a gear ratio of the gearbox assembly, a pitch diameter of the first gear, and a number meshes of the at least one first gear with the second gear.

The gearbox assembly of any preceding clause the first gear being coupled to a shaft assembly of an engine core of a turbine engine, and the second gear being coupled to a fan rotor of a fan of the turbine engine.

A turbine engine including a fan including a fan rotor, an engine core including a shaft assembly, and a gearbox assembly. The gearbox assembly includes a first gear and a second gear. The first gear is coupled to the shaft assembly of the engine core. The first gear includes a plurality of first gear teeth. The second gear is coupled to the fan rotor of the fan. The second gear includes a plurality of second gear teeth. The plurality of first gear teeth and the plurality of second gear teeth mesh with each other as the first gear and the second gear rotate. A profile shape of at least one first gear tooth of the first gear is characterized by a total profile modification between sixty-six (66) micrometers and one hundred twenty (120) micrometers.

The turbine engine of the preceding clause, the total profile modification being between sixty-eight (68) micrometers and ninety (90) micrometers.

The turbine engine of any preceding clause, the total profile modification being a function of a tangential force on the at least one first gear tooth, a stiffness per unit length of the at least one first gear tooth, a mesh contact ratio of the first gear and the second gear, and a unit length of contact between the at least one first gear tooth and a respective second gear tooth.

The turbine engine of any preceding clause, the total profile modification being greater than or equal to $$\frac{F_t}{(3.2\ K_{max}\ \varepsilon\gamma\ X_0)}$$

$F_t$ being the tangential force in Newtons, $K_{max}$ being the stiffness per unit length in Newtons per millimeters micrometers, $\varepsilon\gamma$ being the mesh contact ratio, and $X_0$ being the unit length of contact in millimeters.

The turbine engine of any preceding clause, $F_t$ being between forty-two thousand (42,000) Newtons and seventy (70,000) Newtons.

The turbine engine of any preceding clause, $F_t$ being between forty-seven thousand (47,000) Newtons and fifty-one thousand (51,000) Newtons.

The turbine engine of any preceding clause, $K_{max}$ being between thirteen (13) Newtons per millimeter micrometer and nineteen (19) Newtons per millimeter micrometer.

The turbine engine of any preceding clause, $K_{max}$ being between fifteen (15) Newtons per millimeter micrometer and seventeen (17) Newtons per millimeter micrometer.

The turbine engine of any preceding clause, $\varepsilon\gamma$ being between two point three (2.3) and five (5).

The turbine engine of any preceding clause, $\varepsilon\gamma$ being between two point six (2.6) and four point two (4.2).

The turbine engine of any preceding clause, $X_0$ being between two point five (2.5) millimeters and five point five (5.5) millimeters.

The turbine engine of any preceding clause, $X_0$ being between three point two (3.2) millimeters and four point eight (4.8) millimeters.

The turbine engine of any preceding clause, $F_t$ being a function of a torque of the fan, a gear ratio of the gearbox assembly, a pitch diameter of the first gear, and a number meshes of the at least one first gear with the second gear.

The turbine engine of any preceding clause, the first gear being a sun gear and the second gear being a plurality of planet gears.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A gearbox assembly comprising:
a first gear comprising a plurality of first gear teeth; and
a second gear comprising a plurality of second gear teeth,
the plurality of first gear teeth and the plurality of second gear teeth meshing with each other as the first gear and the second gear rotate,
wherein a profile shape of at least one first gear tooth of the first gear is characterized by a total profile modification between 66 micrometers and 120 micrometers, wherein the total profile modification includes a profile tip relief and a helix relief of the at least one first gear tooth.

2. The gearbox assembly of claim 1, wherein the total profile modification is between 68 micrometers and 90 micrometers.

3. The gearbox assembly of claim 1, wherein the at least one first gear tooth extends from a root to a tip and includes a first end face and a second end face opposite the first end face, and a first axial face and a second axial face opposite the first axial face that extend from the first end face to the second end face, and wherein the total profile modification is zero at a radial center and a helix axial center of the first axial face of the at least one first gear tooth.

4. The gearbox assembly of claim 3, wherein the total profile modification is a maximum at the root and the tip of the at least one first gear tooth, and at the first end face and the second end face of the at least one first gear tooth.

5. The gearbox assembly of claim 1, wherein the gearbox assembly is coupled to a fan of a turbine engine, and the total profile modification is a function of a torque of the fan, a gear ratio of the gearbox assembly, a pitch diameter of the first gear, and a number of meshes of the first gear with the second gear.

6. The gearbox assembly of claim 5, wherein the total profile modification is a function of a stiffness per unit length of the at least one first gear tooth, a mesh contact ratio of the first gear and the second gear, and a unit length of contact between the at least one first gear tooth and a respective second gear tooth.

7. The gearbox assembly of claim 6, wherein the total profile modification is greater than or equal to $$\frac{\left(\frac{\left(\frac{T_{fan}}{Gear\ ratio}\right)}{Pitch\ Diameter}\right)}{Number\ of\ Meshes}}{(3.2\ K_{max}\ \varepsilon\gamma\ X_0)}$$

wherein $T_{fan}$ is the torque of the fan, $K_{max}$ is the stiffness per unit length in Newtons per millimeters micrometers, $\varepsilon\gamma$ is the mesh contact ratio, and $X_0$ is the unit length of contact in millimeters.

8. The gearbox assembly of claim 7, wherein $K_{max}$ is between 13 Newtons per millimeter micrometer and 19 Newtons per millimeter micrometer.

9. The gearbox assembly of claim 7, wherein $\varepsilon\gamma$ is between 2.3 and 5.

10. The gearbox assembly of claim 7, wherein $X_0$ is between 2.5 millimeters and 5.5 millimeters.

11. A turbine engine comprising:
a fan including a fan rotor;
an engine core including a shaft assembly; and
a gearbox assembly comprising:
a first gear coupled to the shaft assembly of the engine core, the first gear comprising a plurality of first gear teeth; and
a second gear coupled to the fan rotor of the fan, the second gear comprising a plurality of second gear teeth, the plurality of first gear teeth and the plurality of second gear teeth meshing with each other as the first gear and the second gear rotate, wherein a profile shape of at least one first gear tooth of the first gear is characterized by a total profile modification between 66 micrometers and 120 micrometers, and wherein the total profile modification includes a profile tip relief and a helix relief of the at least one first gear tooth.

12. The turbine engine of claim 11, wherein the total profile modification is between 68 micrometers and 90 micrometers.

13. The turbine engine of claim 11, wherein the at least one first gear tooth extends from a root to a tip and includes a first end face and a second end face opposite the first end face, and a first axial face and a second axial face opposite the first axial face that extend from the first end face to the second end face, and wherein the total profile modification is zero at a radial center and a helix axial center of the first axial face of the at least one first gear tooth.

14. The turbine engine of claim 13, wherein the total profile modification is a maximum at the root and the tip of the at least one first gear tooth, and at the first end face and the second end face of the at least one first gear tooth.

15. The turbine engine of claim 11, wherein the total profile modification is a function of a torque of the fan, a gear ratio of the gearbox assembly, a pitch diameter of the first gear, and a number of meshes of the first gear with the second gear.

16. The turbine engine of claim 15, wherein the total profile modification is a function of a stiffness per unit length of the at least one first gear tooth, a mesh contact ratio of the first gear and the second gear, and a unit length of contact between the at least one first gear tooth and a respective second gear tooth.

17. The turbine engine of claim 16, wherein the total profile modification is greater than or equal to $$\left[ \frac{\left( \frac{T_{fan}}{\text{Gear ratio}} \right)}{\frac{\text{Pitch Diameter}}{\text{Number of Meshes}}} \right]$$
$$(3.2 \; K_{max} \; \varepsilon \gamma \; X_0)$$

wherein $T_{fan}$ is the torque of the fan, $K_{max}$ is the stiffness per unit length in Newtons per millimeters micrometers, $\varepsilon \gamma$ is the mesh contact ratio, and $X_0$ is the unit length of contact in millimeters.

18. The turbine engine of claim 17, wherein $K_{max}$ is between 13 Newtons per millimeter micrometer and 19 Newtons per millimeter micrometer.

19. The turbine engine of claim 17, wherein $\varepsilon \gamma$ is between 2.3 and 5.

20. The turbine engine of claim 17, wherein $X_0$ is between 2.5 millimeters and 5.5 millimeters.

* * * * *